United States Patent
Dröscher et al.

(10) Patent No.: US 7,823,885 B2
(45) Date of Patent: Nov. 2, 2010

(54) DUAL SEAL ASSEMBLY

(75) Inventors: Peter Dröscher, Geretsried (DE);
Michael Sattler, Grünwald (DE);
Gerard Hamelink, Deventer (NL);
Günther Lederer, Geretsried (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 38 days.

(21) Appl. No.: 12/313,103

(22) Filed: Nov. 17, 2008

(65) Prior Publication Data

US 2009/0134583 A1 May 28, 2009

(30) Foreign Application Priority Data

Nov. 23, 2007 (DE) .................. 20 2007 016 406 U
Nov. 23, 2007 (DE) .................. 20 2007 016 407 U
Mar. 11, 2008 (DE) .................. 20 2008 003 418 U

(51) Int. Cl.
*F16J 15/34* (2006.01)

(52) U.S. Cl. ..................................... 277/369

(58) Field of Classification Search ............. 277/361, 277/369, 399
See application file for complete search history.

(56) References Cited

U.S. PATENT DOCUMENTS

| | | | |
|---|---|---|---|
| 2,672,357 A | 3/1954 | Voytech | |
| 3,479,039 A | 11/1969 | Pinkas | |
| 5,454,572 A * | 10/1995 | Pospisil | 277/368 |
| 6,076,830 A | 6/2000 | Wu et al. | |
| 6,293,555 B1 | 9/2001 | Sedy | |
| 6,494,460 B2 | 12/2002 | Uth | |
| 2005/0242515 A1 | 11/2005 | Brooks et al. | |

FOREIGN PATENT DOCUMENTS

| | | |
|---|---|---|
| DE | 42 25 642 C1 | 7/1993 |
| DE | 201 10 824 U1 | 11/2001 |
| DE | 600 08 080 T2 | 9/2004 |
| DE | 603 13 684 T2 | 9/2007 |
| EP | 1 253 359 A | 10/2002 |
| WO | WO 2006/040865 A1 | 4/2006 |

OTHER PUBLICATIONS

European Search Report dated Apr. 1, 2009.
German Search Report dated Aug. 29, 2008.

* cited by examiner

*Primary Examiner*—Shane Bomar
*Assistant Examiner*—Michael Wills, III
(74) *Attorney, Agent, or Firm*—Scott D. Wofsy; Edwards Angell Palmer & Dodge LLP

(57) ABSTRACT

A dual seal assembly, in particular for sealing a gas compressor, includes a first mechanical seal assembly including a pair of co-operating seal rings, one of which is provided for common rotation with a rotating component and the other of which is provided rotationally fixed at a stationary component. A second mechanical seal assembly includes a pair of co-operating seal rings, one of which is provided for common rotation with a rotating component and the other of which is provided rotationally fixed at a stationary component. One of the seal rings is axially movable and axially biased with a biasing force against the respectively other seal ring to bias facing sliding surfaces of the seal ringss in a mutual sealing engagement. A secondary sealing assembly is provided for sealing the axially movable seal ring with respect to at least one circumferential guiding surface of a guiding component.

9 Claims, 4 Drawing Sheets

DUAL SEAL ASSEMBLY

Figure 1:
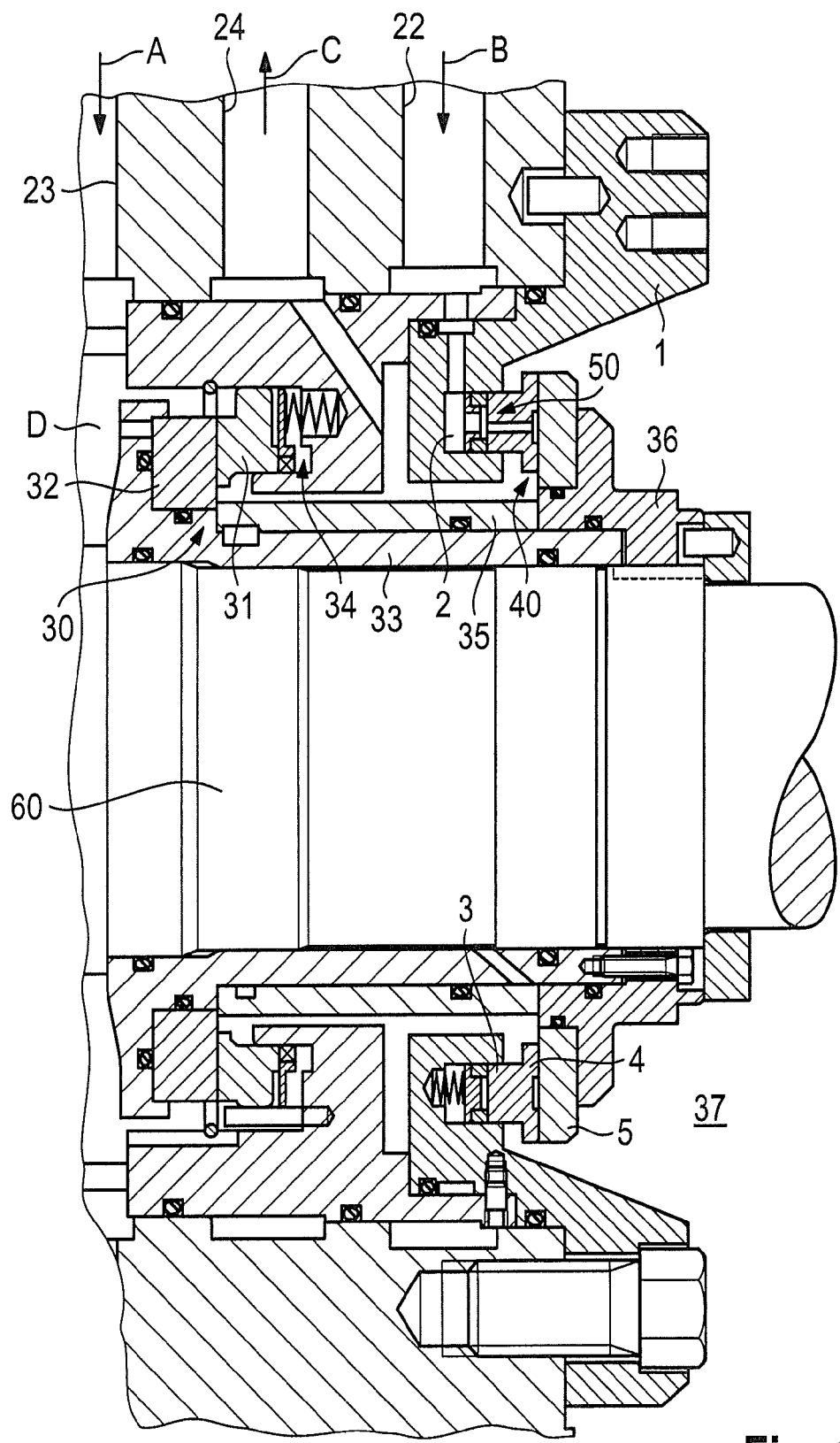

The invention relates to a dual seal assembly comprising first and second mechanical seal assemblies and in particular a mechanical seal assembly having at least one pair of co-operating seal rings, one of which is axially movable and axially biased with a biasing force against the respectively other seal ring, and a secondary sealing assembly for sealing the axially movable seal ring with respect to at least one circumferential guiding surface of a guiding component guiding the movement of the seal ring and a biasing force transmitting ring. Such a mechanical seal assembly is e.g. known from U.S. Pat. No. 3,479,039 A.

In the known mechanical seal assembly, the sealing of the seal ring with respect to a housing is performed by O-rings which are received in grooves in the seal ring. It is also known (WO 2006/040865) to provide one or more O-rings between a housing and the periphery of the seal ring in axially open-ended recesses in the seal ring or the housing, respectively. In any case, the sealing effect of the O-rings is based on an oversize to be provided with respect to the gap which has to be sealed, such that an axial movement of the seal ring occurs against high friction resistances and therewith the mobility important for the functioning of the seal ring is restricted accordingly.

Dual seal assemblies are e.g. used for sealing gas compressors. Herein, a first mechanical seal assembly and a second mechanical seal assembly are arranged on a shaft consequently in the axial direction. The second mechanical seal assembly arranged downstream of the first mechanical seal assembly is mostly identical in construction and served in particular as a fail-safe device in case of a failure of the first mechanical seal assembly. This dual seal assembly is further separated from a shaft bearing by a third seal, e.g. a swim ring seal. Said third seal is arranged behind the dual seal assembly in the axial direction and therewith serves as a bearing oil seal in the region of the second seal ring assembly. Hence, there results a large axial installation length of the seals at the shaft. However, axial installations lengths being as short as possible are very important, in particular when gas compressors are concerned.

It is an object underlying the invention to provide a dual seal assembly having a shortened axial installation length and comprises a mechanical seal assembly in which the axial mobility of the respective seal ring is not or substantially less affected and which simultaneously simplifies the mounting thereof.

This object is solved by the features of claim 1.

The inventive dual seal assembly has the advantage that a third seal arranged downstream of the mechanical seal assemblies in the axial direction can be omitted. As a consequence, the axial installation length of the dual seal assembly can be very short. According to the invention, this is achieved in that a second mechanical seal assembly comprises a secondary sealing assembly being provided at a force transmitting ring, while the axially movable seal ring is devoid of any grooves or the like for receiving the secondary sealing members, such as O-rings. The axial mobility of the seal ring is therefore not affected by such secondary sealing members. The secondary seal assembly is thus provided between the first and second mechanical seal assemblies in the axial direction of a shaft. The secondary sealing members, which are preferably O-rings, are retained and arranged at the force transmitting ring in a specific manner such that a radial sealing effect to a substantial extend is only generated when the secondary sealing members are loaded by an axial force which effects a radial expansion of the secondary sealing members. Therefore, the secondary sealing members do not need to have an oversize with respect to the gap to be sealed, such that the force transmitting ring, together with the secondary sealing members, can be moved axially unresisted by frictional resistances relative to the surface to be sealed. This simplifies the mounting of the mechanical seal assembly substantially and further guarantees that the radial sealing may be adapted exactly to the requirements of the respective mechanical seal assembly.

Nevertheless, commercially available secondary sealing members can be used. It is a feature of the invention that the secondary sealing members slightly protrude axially from the force transmitting ring, and therewith an abutment between the force transmitting ring and the seal ring is created, said abutment not being rigid, but elastically flexible. Due to this, the seal ring can change its position with respect to the force transmitting ring to a certain extent, which has a self-compensating effect on the configuration of the sealing gap such that same maintains its desired configuration. According to the invention, the biasing force acts on the seal ring through the force transmitting ring and the secondary sealing members and is therefore practically not weakened by the secondary sealing members.

According to a further development of the invention, it may further be provided that the force transmitting ring is interspersed with an axial aperture and on the other side a flow passage is provided in the seal ring, which passage opens out at a sealing gap promoting recess in the seal ring surface. Therewith, a pressure medium can be supplied through the force transmitting ring to the sealing gap promoting recess, in order to prematurely effect a sealing gap formation between the co-operating seal rings of the seal ring pair, wherein the force transmitting ring is maintained in a pressure-released state with respect to the pressure medium. Concerning further developments, reference is made to the claims.

It is particularly preferred that the structure of the first mechanical seal assembly corresponds to the structure of the second mechanical seal assembly. Due to this, in particular a length of the dual seal assembly in the axial direction of a shaft may be further reduced. This is possible in that, in the first mechanical seal assembly, also an additional labyrinth-sealing, which has been used in the state of the art up to now, can be omitted. Due to the inventive dual mechanical seal assembly comprising two identically constructed mechanical seal assemblies, a further axial shortening of the dual seal assembly may be achieved in comparison to the state of the art, which comprises, besides two commonly structured mechanical seal assemblies, also a labyrinth-sealing for sealing against a product and a swim ring sealing for sealing against a bearing. However, this shortening does not cause any disadvantages with regard to the sealing requirements. Further, the identically constructed inventive mechanical seal assemblies enable a high proportion of identical components for the dual seal assembly.

It is particularly preferred that the first and second mechanical seal assemblies according to the invention are arranged back-to-back. It is further preferred that a leakage drain is arranged in an axial direction between the first and second mechanical seal assemblies. It is further preferred, that the first and second mechanical seal assemblies are arranged on an identical cross-section.

The inventive dual seal assembly is preferably used in gas compressors, wherein the second mechanical seal assembly provided with the secondary sealing assembly is preferably pressurized with a neutral sealing gas or a purified product gas, the pressure of which ranges slightly above the flare pressure of the gas compressor or the complete plant, e.g. a refinery plant. In this context, the secondary sealing assembly provides a sealing toward a bearing portion of the shaft. A leakage from the first and second mechanical seal assemblies is preferably discharged through a common leakage drain which is arranged in the axial direction between the first and second mechanical seal assemblies. This also contributes to a short axial installation length of the dual seal assembly. It shall be noted that the second mechanical seal assembly is configured such that it may assume the function of a safety seal in case of failure of the first mechanical seal assembly, at least for a short time, i.e. until the gas compressor stops (runs down).

It is a further advantage of the inventive dual seal assembly that the secondary sealing assembly operates free of wear, compared to the third swim ring seal or labyrinth-sealing used in the state of the art. The inventive dual seal assembly is, therefore, manufactured at less costs and more easily and safer in operation.

Figure 2:
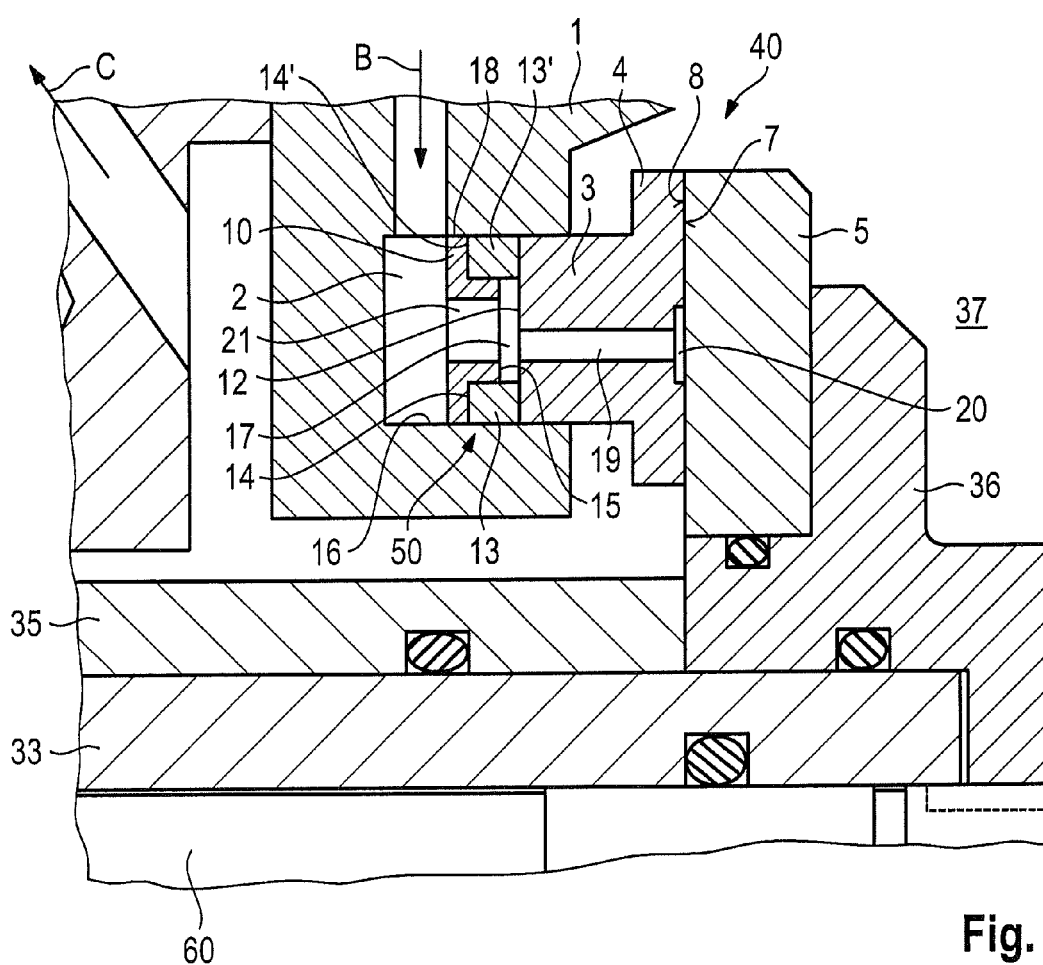
Figure 3:
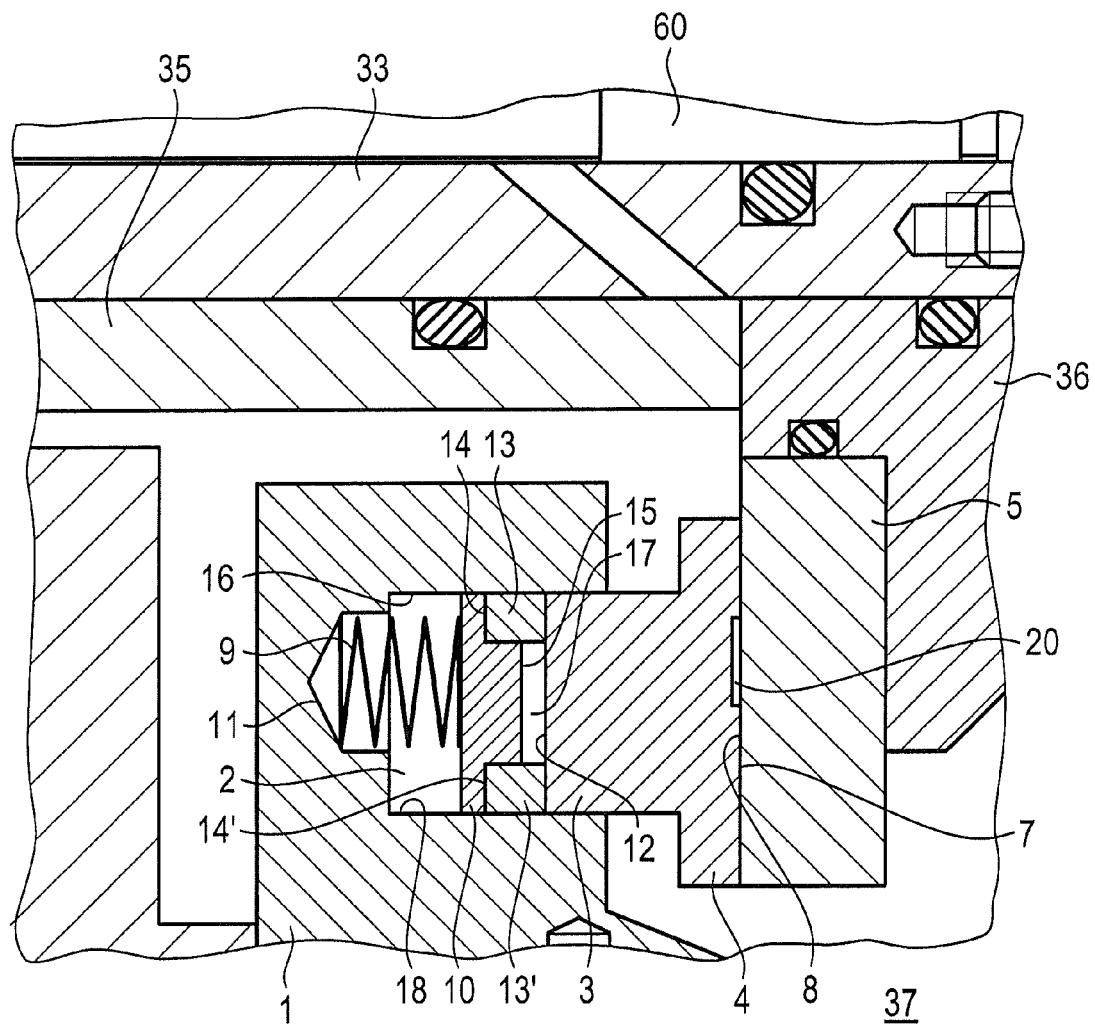
Figure 4:
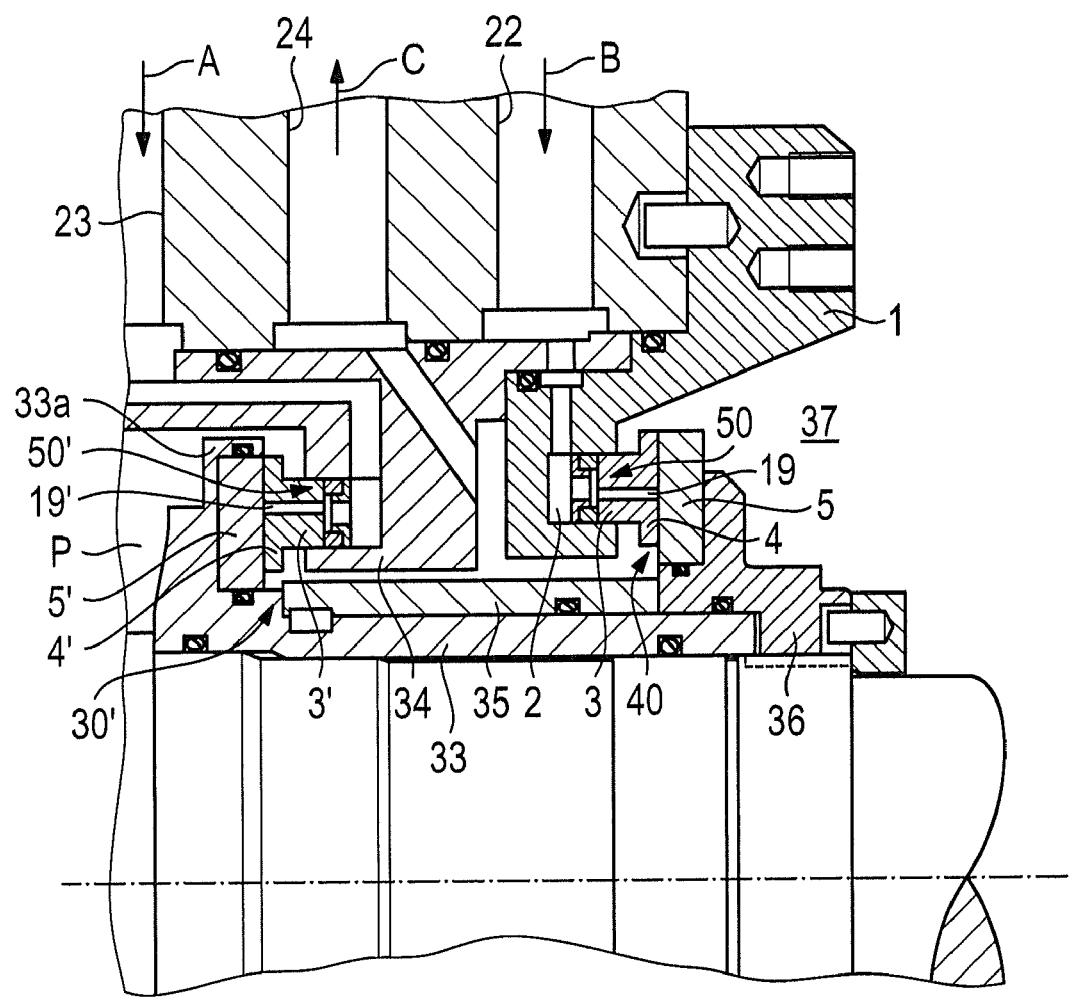

In the following, the invention is explained in more detail on the basis of preferred embodiments referring to the drawing, in which:

FIG. 1 shows a schematic sectional view of a dual seal assembly according to a first embodiment of the invention, FIG. 2 shows an enlarged first partial view of a second mechanical seal assembly of the dual seal assembly of FIG. 1, FIG. 3 shows a schematic second partial view of the second mechanical seal assembly of FIG. 1, and FIG. 4 shows a schematic sectional view of a dual seal assembly according to a second embodiment of the invention.

As is discernible from the schematic view of the first embodiment in FIG. 1, an inventive dual seal assembly comprises a first mechanical seal assembly 30, a second mechanical seal assembly 40 and a secondary sealing assembly 50 which is arranged at the second mechanical seal assembly 40. The first and second mechanical seal assemblies 30, 40 are arranged consecutively in the axial direction on a shaft 60 of a gas compressor. Reference numeral 37 designates a bearing space in which a bearing (not shown) of the shaft is disposed. A product space (not shown) is disposed at the opposite side of the bearing space 37.

The first mechanical seal assembly 30 comprises a rotationally fixed seal ring 31 and a rotating seal ring 32. The rotating seal ring 32 is fixed on a mounting sleeve 33 which is arranged on the shaft 60. Further, the first mechanical seal assembly 30 comprises a biasing device 34 to bias the rotationally fixed seal ring 31 in the axial direction. Reference numeral 35 designates an intermediate sleeve which is arranged on the mounting sleeve 33. The intermediate sleeve is axially arranged between an annular flange member 36 fixedly connected to the mounting sleeve 33 and a stepped portion in the mounting sleeve. The first mechanical seal assembly 30 is pressurized by a sealing gas through a flow passage 23 and a space D. During operation, a leakage is drained through the sliding surfaces of the seal rings 31, 32 and a leakage drain passage 24, e.g. toward a flare of a natural gas production plant which uses the gas compressor for compressing the natural gas, as it is indicated by arrow C in FIG. 1. The space D is sealed against the product room through a labyrinth-sealing (not shown).

The second mechanical seal assembly 40 is arranged adjacent to the first mechanical seal assembly 30 in the axial direction of the shaft 60. The leakage drain passage 24 extends between the first and second mechanical seal assemblies 30, 40 (cf. FIG. 1).

In the drawing, reference numeral 1 designates a stationary component, in particular a multi-part housing, and reference numeral 2 designates a guiding ring space or an annular recess having an end side open end and being provided in the housing, into which an axial lug portion 3 of a rotationally fixed but axially movable seal ring 4 of the second mechanical seal assembly 40 protrudes, such that the seal ring 4 is retained and axially guided in the guiding ring space 2 (cf. FIGS. 2 and 3).

The rotationally fixed seal ring 4 co-operates with a seal or counter ring 5 which is mounted on the annular flange 36 for a common rotation, which flange may be placed on and assembled with the rotating shaft 60 to rotate therewith. Upon rotation of the shaft 60, also the seal ring 5 is caused to equally rotate, whereas the seal ring 4 is retained rotationally fixed with respect to the housing 1 by rotationally fixing means (not shown). Such means are known to the skilled person and do not have to be explained in more detail herein.

The seal rings 4, 5 have opposite sliding or sealing surfaces 7, 8, between which a sealing gap is formed during operation, in order to seal the surroundings at one periphery with respect to the surroundings at the other periphery of the pair of seal rings. Upon standstill of the mechanical seal assembly, the sealing surfaces 7, 8 are maintained in a mutual sealing engagement due to a biasing force.

For this purpose, a biasing device 9 is provided (cf. FIG. 3), which may be one or a plurality of biasing springs circumferentially arranged about the guiding ring space 2, for exerting said biasing force on the seal ring 4. The biasing force of the biasing device 9 does not act directly on the seal ring 4, but through a force transmitting ring 10 which is arranged in the guiding ring space 2 to be axially movable. On axial end of the biasing device 9 is supported at the force transmitting ring 10 and the other axial end thereof is supported at the housing 1, preferably at the bottom of blind holes 11 provided in the housing 1. Due to the effect of the biasing force, the force transmitting ring 10 experiences an axial movement in the guiding ring space 2 toward an adjacent face end 12 of the seal ring 4, such that the biasing force is transmitted to the seal ring.

According to the invention, the force transmitting ring 10 comprises a pair of sealing members 13, 13' made of an elastic material, such as an elastomer, which serve to seal the seal ring 4 with respect to the housing 1. Preferably, the sealing members 13, 13' are commercially available O-rings which are arranged in circumferentially extending recesses 14, 14' having a cross-section adapted to the cross-sectional configuration of the sealing members 13, 13', e.g. a pitch-circular or square cross-section, in a corner region between the outer and inner peripheries and an end face 15 of the force transmitting ring 10 facing the seal ring 4, such that the cross-section of each sealing member 13, 13' protrudes axially beyond the end face 15 by a suitable small distance of e.g. approx. 0.5 to 1 mm upon a cross-sectional dimension of 3.5 to 7.0 mm. Preferably, the sealing members 13, 13' also protrude beyond the outer and inner peripheries of the force transmitting ring 10 by a small distance.

Preferably, the sealing members 13, 13' have the same cross-sectional dimensions, and their cross-sectional centers lie on a common radial plane in a co-axial arrangement.

The sealing members 13, 13' are configured to engage with adjacent inner and outer peripheral surfaces 16, 18 of the guiding ring space 2, when the sealing members 13, 13' experience a radial expansion due to an axial force being exerted. Without said axial force, no engagement or only a very small engagement of the sealing members 13, 13' with the peripheral surfaces 16, 18 occurs, such that the axial mobility of the force transmitting ring 10 is not affected under these conditions.

When the force transmitting ring 10 with the sealing members 13, 13' is pressed against the adjacent face end 12 of the seal ring 4 by the biasing force exerted by the biasing device 9, this results in the formation of a gap space 17 between the force transmitting ring 10 and the face end 12 of the seal ring 4, which is limited and sealed at its outer and inner peripheries by the sealing members 13, 13'. Further, the axial force acting on the sealing members 13, 13' has the effect that same experience a radial expansion and therewith enter into a sealing engagement with the peripheral surfaces 16, 18 of the guiding ring space 12 in order to seal the seal ring 4 with respect to the housing 1.

Therewith, the invention enables the insertion of the force transmitting ring 10 into the guiding ring space 12 without any frictional resistance from the sealing members 13, 13'. Further, the consequence of the axial engagement between the force transmitting ring 10 and the seal ring 4 through the sealing member 13, 13' is that the engagement is not rigid, but flexible, and therefore positional deviations between the seal ring 4 and the force transmitting ring 10 can be compensated.

As is further shown in FIG. 2, the rotationally fixed seal ring 4 is axially interspersed with a flow passage 19 which opens out at one end at the face end 12 and on the other end into an annular recess 20 having a suitable small depth, which is inserted into the sliding surface of the seal ring 4. If desired, also a plurality of such flow passages may be provided. Through each flow passage 19, a pressure medium, e.g. a gas, in particular air, may be supplied into the annular recess 20 in order to effect or promote the sealing gap formation between the sliding surfaces 7, 8. The force transmitting ring 10 is interspersed with a passage 21 which opens out on the one end within the area of the end face 15 enclosed by the sealing members 13, 13' and on the other end into the guiding ring space 2 into which, on the other side, a flow passage 22 provided in the housing 1 opens. If desired, also a plurality of such flow passages 22 may be provided. A flow medium supplied into the or each flow passage 22, as indicated by the arrow B, may therefore be supplied through the guiding ring space 2, the passage 21 in the force transmitting ring 10, the gap 17 and the flow passage 19 toward the recess 20 in the sliding surface 7 of the seal ring 4. A leakage is then drained through the leakage drain passage 24 toward a flare. The second mechanical seal assembly 40 is pressurized with a pressure somewhat higher than the flare pressure through the flow passage 22 and the guiding ring space 2. The recess 20 divides the sealing gap between the seal rings 4, 5 into a radially inner sealing portion and a radially outer sealing portion, wherein the radially outer sealing portion performs the sealing of the bearing space 37. The second mechanical seal assembly is thus formed with two co-axial sealing portions.

In the preferred embodiment of the invention described above, the force transmitting ring 10 of the second mechanical seal assembly comprises a pair of sealing members 13, 13' which are arranged near the inner or outer periphery of the force transmitting ring 10 according to the invention. If desired, also only one such sealing member may be arranged at the force transmitting ring in the inventive manner, such that a sealing with respect to only one circumferential guiding surface would be created, whereas the sealing with respect to the other circumferential guiding surface could be performed otherwise, unless such a sealing is completely omitted. Further, it is obvious that the described measures for supplying a flow medium to the recess 20 provided in the sliding surface of the rotationally fixed seal ring 4 can be omitted, in particular if the sealing gap formation is obtained or promoted by other suitable measures, such as promoting recesses in the sealing surface, as it is described in more detail in Burgmann, Gas Seals, Selbstverlag 1997, page 17.

In the following, a dual seal assembly according to a second embodiment of the invention is described in detail with reference to FIG. 4, wherein identical or functionally identical components are designated with the same reference numerals as in the first embodiment.

As is discernible from FIG. 4, the first mechanical seal assembly 30' of the dual seal assembly of the second embodiment is structured identical to the second mechanical seal assembly 40. As is shown in FIG. 4, the first and second mechanical seal assemblies 30', 40 are arranged back-to-back. Equal to the second mechanical seal assembly 40, the first mechanical seal assembly 30' comprises a rotationally fixed seal ring 4', an axial lug portion 3' and a rotating seal ring 5'. In the same manner as in the second mechanical seal assembly 40, a sealing gap is formed between the seal rings 4', 5' during operation, in order to seal a product space P. For this purpose, a pressure medium, in particular air, is supplied through the flow passage 23 and the flow passage 19', as indicated by arrow A. Further, the rotating seal ring 5' is fixed on the mounting sleeve 33 by a collar 33a. Therewith, the first mechanical seal assembly 30' directly seals the product space P, such that an additional labyrinth-sealing, which has been used in the state of the art up to now, can be omitted. As a consequence, the dual seal assembly according to the second embodiment is more compact in the axial direction, such that the four seals used in the state of the art can be replaced by the two inventive mechanical seal assemblies 30', 40, as is shown in FIG. 4. The back-to-back arrangement of the first and second mechanical seal assemblies 30', 40 further enables to provide only one leakage drain passage 24. The leakage drain passage 24 is here arranged in the axial direction between the first mechanical seal assembly 30' and the second mechanical seal assembly 40. Since both mechanical seal assemblies 30', 40 have the same structure and are only mounted in opposite directions, a high proportion of identical components for the dual seal assembly may be achieved. The sealing gas supplied through the flow passage 23 has a pressure which is somewhat higher than the product pressure of the product in space P. Hereby, the sealing gas in the sealing gap flows between the sealing rings 4', 5' radially inwardly or radially outwardly and therewith guarantees that the mechanical seal enables the sealing of the product space P. The inventive tandem arrangement of the identically constructed mechanical seal assemblies 30', 40 therewith enables a very short installation length when compressor construction is concerned, which has a very positive effect on the large shaft lengths in compressor constructions, in particular concerning the synchronizing characteristics of the shafts and the balancing processes. Apart from that, the first mechanical seal assembly 30' is constructed identical to the second mechanical seal assembly 40 described with reference to FIGS. 1 to 3, such that reference is made to the description given in this respect.

According to the invention, a dual seal assembly comprising first and second mechanical seal assemblies 30, 40 may thus be provided, which has only a small installation length in the axial direction of a shaft. The secondary sealing assembly 50 is arranged directly at the second mechanical seal assembly 40, without any grooves or the like being required at one of the seal rings. Therewith, the inventive dual seal assembly assumes the function which has up to now been assumed by three separate seals arranged consecutively in the axial direction, i.e. two mechanical seal assemblies and one swim ring seal. In this context, the inventive dual seal assembly is particularly advantageous since in compressor construction, each millimetre, which may be spared at the distance of the shaft bearings, is competed for. In addition, the inventive solution is much simpler, cheaper and also safer in operation than the solutions used in the state of the art up to now.

What is claimed is:

1. A dual seal assembly, in particular for sealing a gas compressor, comprising:
    a first mechanical seal assembly including a pair of co-operating seal rings, one of which is provided for common rotation with a rotating component and the other of which is provided rotationally fixed at a stationary component,
    a second mechanical seal assembly including a pair of co-operating seal rings, one of which is provided for common rotation with a rotating component and the other of which is provided rotationally fixed at a stationary component, one of the seal rings being axially movable and axially biased with a biasing force against the respectively other seal ring, said biasing force being transmittable through a force transmitting ring to the respective seal ring, in order to bias facing sliding surfaces of the seal rings, between which a sealing gap is formed during operation, in a mutual sealing engagement, and a secondary sealing assembly for sealing the axially movable seal ring with respect to circumferential guiding surfaces of a guiding component guiding the movement of the seal ring and the force transmitting ring, wherein the secondary sealing assembly is provided at the force transmitting ring and consists a pair of annular sealing members made of an elastic material, said sealing members being retained at the force transmitting ring near its periphery and its end face facing the seal ring such that the sealing members protrude beyond the force transmitting ring at least axially and are movable radially beyond the periphery of the end face due to the effect of the biasing force, such that the annular sealing members are configured to sealingly engage simultaneously with the seal ring and the circumferential guiding surfaces, whereas such engagement is substantially prevented when no biasing force is effective, wherein the axially movable seal ring is devoid of any grooves for receiving sealing members, wherein the circumferential guiding surfaces delimit a guiding ring space therebetween, in which the force transmitting ring and at least an axial portion of the seal ring is received, wherein one of the sealing members is retained near the inner periphery and the other of the sealing members is retained near the outer periphery of the force transmitting ring of the end face facing the seal ring, wherein the one sealing member is configured to sealingly engage with one of the circumferential guiding surfaces and the other sealing member is configured to sealingly engage with the other circumferential guiding surface, while the sealing members simultaneously delimit an axial gap space region circumferentially at the end face, wherein the first mechanical seal assembly and the second mechanical seal assembly are arranged back-to-back.

2. The dual seal assembly of claim 1, wherein the sealing members substantially have the same cross-sectional dimensions, wherein the cross-sectional centers of the sealing members are arranged on a substantially common radial plane.

3. The dual seal assembly of claim 1, wherein the force transmitting ring is interspersed with at least one axial aperture, wherein the aperture at one end opens out within the gap space region.

4. The dual seal assembly of claim 3, wherein at least one flow passage is defined in the seal ring, which at one end opens out at the face end thereof facing the force transmitting ring in alignment with the axial gap space region and at the other end opens out into the sliding surface thereof, in order to supply a flow medium promoting the sealing gap formation between the co-operating sliding surfaces.

5. The dual seal assembly of claim 1, wherein each sealing member is formed as an O-ring.

6. The dual seal assembly of claim 1, wherein the rotationally fixed seal ring of the second mechanical seal assembly is axially movable.

7. The dual seal assembly of claim 1, wherein a spring biasing device for applying the biasing force is provided at the second mechanical seal assembly.

8. The dual seal assembly of claim 1, further comprising a leakage drain passage which is arranged in the axial direction between the first mechanical seal assembly and the second mechanical seal assembly.

9. The dual seal assembly of claim 1, wherein the first mechanical seal assembly and the second mechanical seal assembly are identically constructed.

* * * * *